(12) United States Patent
Liu et al.

(10) Patent No.: US 11,352,035 B1
(45) Date of Patent: Jun. 7, 2022

(54) AUXILIARY MONITORING SYSTEM FOR TRACTION SUBSTATION

(71) Applicant: EAST CHINA JIAOTONG UNIVERSITY, Nanchang (CN)

(72) Inventors: Yande Liu, Nanchang (CN); Jun Hu, Nanchang (CN); Yong He, Nanchang (CN); Bin Yu, Nanchang (CN); Tongzheng Lin, Nanchang (CN); Fan Xu, Nanchang (CN); Chengcheng Guo, Nanchang (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 0 days.

(21) Appl. No.: 17/573,576

(22) Filed: Jan. 11, 2022

(30) Foreign Application Priority Data

Jan. 13, 2021 (CN) .......................... 202110040747.X

(51) Int. Cl.
  *G08B 25/10* (2006.01)
  *B61L 25/00* (2006.01)
  (Continued)

(52) U.S. Cl.
  CPC ................ *B61L 25/00* (2013.01); *G08B 7/06* (2013.01); *G08B 13/04* (2013.01); *G08B 17/06* (2013.01);
  (Continued)

(58) Field of Classification Search
  CPC ......... G05D 1/0225; G05D 2201/0207; G08B 25/006; G08B 25/10; G08B 7/06;
  (Continued)

(56) References Cited

U.S. PATENT DOCUMENTS

2012/0072053 A1\* 3/2012 Zesch ................... G21C 17/013
  701/2
2021/0324991 A1\* 10/2021 Lagodka ................ B62D 61/12

FOREIGN PATENT DOCUMENTS

CN  104052151 A    9/2014
CN  104391506 A  * 3/2015
  (Continued)

OTHER PUBLICATIONS

First Office Action from Patent Office in a counterpart Chinese Patent Application 202110040747.X, dated Aug. 12, 2021.
(Continued)

*Primary Examiner* — Andrew W Bee

(57) ABSTRACT

The video monitoring system collects a video data stream in real time; the device inspection system collects and uploads an image of each electrical device along a line; the voice communication system realizes a voice call between an inspection staff and a back-end monitoring staff; the environmental monitoring system monitors a temperature, a humidity, and a water intake in the traction substation and each electrical device; the fire alarm system monitors a fire in the traction substation; the sulfur hexafluoride gas monitoring system monitors a sulfur hexafluoride gas leakage in an electrical device; the security prevention system collects alarm information; the power lighting monitoring system collects operation information of a power lighting device; the power monitoring system monitors an input current and
(Continued)

voltage and an output current and voltage of the traction substation in real time. The information is transmitted to the railroad dispatching center.

7 Claims, 5 Drawing Sheets

(51) Int. Cl.
| | | |
|---|---|---|
| G08B 7/06 | (2006.01) | |
| G08B 25/00 | (2006.01) | |
| H04N 1/32 | (2006.01) | |
| G08B 17/06 | (2006.01) | |
| G08B 13/04 | (2006.01) | |
| G08C 23/06 | (2006.01) | |

(52) U.S. Cl.
CPC ........... *G08B 25/006* (2013.01); *G08B 25/10* (2013.01); *G08C 23/06* (2013.01); *H04N 1/32* (2013.01)

(58) Field of Classification Search
CPC ......... G08B 13/04; B61L 25/00; G08C 23/06; H04N 1/32
See application file for complete search history.

(56) References Cited

FOREIGN PATENT DOCUMENTS

| | | | | | |
|---|---|---|---|---|---|
| CN | 104953709 | A | * | 9/2015 | |
| CN | 105573321 | A | * | 5/2016 | ........... G05D 1/0236 |
| CN | 105720657 | A | | 6/2016 | |
| CN | 107425454 | A | * | 12/2017 | ............... H02B 3/00 |
| CN | 108789354 | A | * | 11/2018 | |
| CN | 109240290 | A | * | 1/2019 | ........... G05D 1/0214 |
| CN | 109618416 | A | | 5/2019 | |
| CN | 110492607 | A | * | 11/2019 | |
| CN | 210074876 | U | * | 2/2020 | |
| CN | 111862379 | A | * | 10/2020 | |
| CN | 111864917 | A | * | 10/2020 | |
| CN | 211906082 | U | * | 11/2020 | |
| CN | 211930343 | U | * | 11/2020 | |
| CN | 106774322 | B | * | 12/2020 | ........... G05D 1/0263 |
| CN | 113708491 | A | * | 11/2021 | |

OTHER PUBLICATIONS

Decision to grant patent from China patent office in a counterpart Chinese patent Application 202110040747.X, dated Oct. 20, 2021.

* cited by examiner

AUXILIARY MONITORING SYSTEM FOR TRACTION SUBSTATION

TECHNICAL FIELD

The present disclosure relates to the field of substation monitoring technologies, and in particular to an auxiliary monitoring system for a traction substation.

BACKGROUND

With the rapid development of China's urbanization and economic construction, passenger lines, high-speed railroads, and urban rail transit have entered a new stage of historical development. At present, China's railroad technology and device level and management level is rapidly improving, and the line passenger trains have made the leap from regular speed to high speed. In the background of the rapid development of China's railroads in the direction of "high-speed and heavy-duty", in order to further meet the needs of high-density passenger flow in large urban clusters, the operation and maintenance level of existing railroads has put forward higher requirements, and high-speed railroads, passenger lines and urban rail transit letters need to enter the fast track of historical development. The basic task of rail transportation is to transport passengers and goods to the destination safely and accurately and on time, and a reliable traction power supply system shall be applied to ensure the safe and smooth operation of locomotives or trains.

The safe and reliable operation of the traction power supply system is a prerequisite for the safety and punctuality of rail transportation, and a traction substation, as an important component of the traction power supply system, is receiving increasing attention. In the face of China's railroad speed increase and the high requirements of railroad safety, the requirements for the existing traction substation monitoring system are getting higher and higher. Therefore, the decisive role of traction power supply system on the safety of electric traction trains is becoming more and more prominent. The existing "unmanned and unattended" operation and management mode is being used more and more widely with its high efficiency and stability, and the standard of safety monitoring system is getting higher and higher. The existing research shows that the unmanned management mode of traction substation and the existing safety monitoring system can no longer match, and a modern intelligent monitoring system is urgently needed to realize the automated management of railroad traction substation.

At present, there are still many problems in the railroad traction substation monitoring system. The problems are mainly focused on: the lack of integrated information platform in the system network, which cannot meet the modern substation's hierarchical and coordinated control of power grid resources; the low data utilization of each monitoring sensor in the system, and the lack of screening and discriminating information and cross-referencing between information to achieve all-round safety monitoring of the traction substation. In the face of the urgent need for intelligent power grid construction and the increasing demand for intelligent monitoring level, there is an urgent need to design a digital monitoring system that can adapt to the traction power supply system in order to realize all-round monitoring of the traction power supply system.

SUMMARY OF THE DISCLOSURE

To solve the above technical problems, the present disclosure provides an auxiliary monitoring system for a traction substation, wherein the video monitoring system is configured to collect a video data stream in real time, to realize video monitoring in the traction substation; the device inspection system is configured to collect and upload an image of each electrical device along a line; the voice communication system is configured to realize a voice call between an inspection staff and a back-end monitoring staff; the environmental monitoring system is configured to monitor a temperature, a humidity, and a water intake in the traction substation and each electrical device; the fire alarm system is configured to monitor a fire in the traction substation in real time and provide corresponding alarm information; the sulfur hexafluoride gas monitoring system is configured to monitor a sulfur hexafluoride gas leakage in an electrical device; the security prevention system is configured to collect alarm information such as access control and electronic fence in the traction substation, to prevent an intrusion of other foreign personnel or large animals; the power lighting monitoring system is configured to collect operation information of a power lighting device such as a lighting controller, a water pump, a fan, etc.; the power monitoring system is configured to monitor an input current and voltage and an output current and voltage of the traction substation in real time. In this way, all-round safety monitoring of traction substation may be realized, improving the safe operation of traction substation. The information monitored by traction substation is transmitted to railroad dispatching center through 5G communication technology to realize information sharing.

In order to achieve the above purpose, the present disclosure provides an auxiliary monitoring system for a traction substation:

An auxiliary monitoring system for a traction substation, including: a video monitoring system, a device inspection system, a voice communication system, an environmental monitoring system, a fire alarm system, a sulfur hexafluoride gas monitoring system, a safety prevention system, a power lighting monitoring system, a power monitoring system, a control box, and a 5G controller; wherein the video monitoring system is configured to collect a video data stream in real time, to realize video monitoring in the traction substation; the device inspection system is configured to collect and upload an image of each electrical device along a line; the voice communication system is configured to realize a voice call between an inspection staff and a back-end monitoring staff; the environmental monitoring system is configured to monitor a temperature, a humidity, and a water intake in the traction substation and each electrical device; the fire alarm system is configured to monitor a fire in the traction substation in real time and provide corresponding alarm information; the sulfur hexafluoride gas monitoring system is configured to monitor a sulfur hexafluoride gas leakage in an electrical device; the security prevention system is configured to collect alarm information such as access control and electronic fence in the traction substation, to prevent an intrusion of other foreign personnel or large animals; the power lighting monitoring system is configured to collect operation information of a power lighting device such as a lighting controller, a water pump, and a fan; the power monitoring system is configured to monitor an input current and voltage and an output current and voltage of the traction substation in real time; the video monitoring system, the device inspection system, the voice communication system, the environmental monitoring system, the fire alarm system, the sulfur hexafluoride gas monitoring system, the security system, the power lighting monitoring system, and the power monitoring system each transmits collected information to the control box; the information is processed and calculated by the control box and transmitted to a traction substation monitoring center; the 5G controller is controlled to transmit a processed result to a railroad dispatching center monitoring station.

In some embodiments, the control box is arranged with a first Wi-Fi module and a microcontroller system;

In some embodiments, the video monitoring system uses an existing camera in the traction substation for video monitoring of each area and transmit the video to the control box through optical fiber. The first Wi-Fi module in the control box transmits the video to the traction substation monitoring center, and the video is transmitted to the dispatching center monitoring station through the 5G controller.

In some embodiments, the device inspection system includes a tracer robot, a high definition (HD) camera, a second Wi-Fi module, a wireless energy receiver, a reader-writer, charging stations, and patrol points; wherein the second Wi-Fi module is arranged in the tracer robot to establish a wireless communication relationship with the first Wi-Fi module; the wireless energy receiver and the reader-writer are arranged at a bottom of the tracer robot, and the tracer robot is planned to follow a tracer route in the traction substation; one of the charging station is arranged at a starting point of the tracer route, and the other of the charging station is arranged at an end point of the tracer route; the patrol points are each arranged next to a corresponding device; when the tracer robot is at one of the charging stations, the one of the charging stations sends electrical energy to the wireless energy receiver to realize wireless charging of the tracer robot; when the tracer robot reaches one of the patrol points, the tracer robot is configure to stop and take a picture of a corresponding electric device at the one of the patrol points, and send the picture to the first Wi-Fi module in the control box through the second Wi-Fi module; the picture is transmitted to the traction substation monitoring center through an optical fiber; when the tracer robot reaches the end point, the tracer robot is configure to stop at the end point for charging, and waits for another inspection requirement; when the tracer robot receives another inspection requirement, the tracer robot is configure to move from the end point to the starting point again, thereby guaranteeing an uninterrupted power supply to the tracer robot.

In some embodiments, each of the charging stations includes a transponder and a radio energy transmitter; the charging station is arranged with the transponder, and after the tracer robot reaches the starting point or the end point, the reader-writer is capable of identifying the transponder; in response to identifying the transponder, the tracer robot is configured to stop running, and the electrical energy is transmitted from the radio energy transmitter to the radio energy receiver, thereby realizing the power supply to the tracer robot.

In some embodiments, each patrol point is arranged with the transponder, every time the robot identifies a transponder, it indicates that it is next to the device that needs to be inspected, at which point the HD camera on the robot starts image acquisition of the electrical device.

In some embodiments, a scheme of the tracer robot to identify the starting point, the end point, and the patrol points is: the tracer route is set up in the tracer robot, including setting the number of the patrol points, the starting point, and the end point; the transponders are arranged at the starting point, the patrol points, and the end point; a current location of the tracer robot is determined by calculating the number of the transponders; the tracer robot is placed at the starting point for charging, and when an inspection is required, the tracer robot is configured to start moving along the set tracer route; when the tracer robot reaches a first patrol point, the tracer robot is configured to start the HD camera to take a picture of a corresponding electrical device at the first patrol point and upload the picture to the traction substation monitoring center; after the picture is uploaded, the tracer robot is configured to move to a next patrol point to take another picture; after all the patrol points are completely passed, the tracer robot determines that the inspection is over; the tracer robot reaches the end point by moving to a next one of the transponders, while getting charged at the end point; when a second inspection is to be carried out, the end point is taken as another starting point and the second inspection is carried out by the tracer robot moving in a reverse direction.

In some embodiments, the voice communication system includes a microphone and a loudspeaker. The microphones and the loudspeakers are arranged next to each electrical device in the traction substation monitoring center. When the inspection staff inspects the devices of the traction substation on site, he or she may communicate with the traction substation monitoring center by voice through the microphone and loudspeaker.

In some embodiments, the environmental monitoring system includes a temperature sensor, a humidity sensor, and a flood sensor; each electrical device is arranged with the temperature sensor, the humidity sensor, and the flood sensor; the flood sensor is arranged at a bottom of a corresponding electrical device; the temperature sensor and the humidity sensor are configured to detect the temperature and the humidity in the corresponding electrical device; the flood sensor is configured to detect whether the corresponding electric device is flooded; another temperature sensor, another humidity sensor, and another flood sensor are arranged in a key area of the traction substation to detect a temperature, a humidity and water content information in the traction substation; information detected by the temperature sensor, the humidity sensor, and the flood sensor is transmitted to the microcontroller system in the control box for analysis and processing.

In some embodiments, the fire alarm system includes a fire detector and a sound and light alarm; the fire detector and the sound and light alarm are arranged in each electrical device and a key area in the traction substation; the fire detector is configured to monitor an occurrence of fire in the traction substation and each electrical device in real time; in response to a fire occurring, the microcontroller system is configured to control the sound and light alarm to send alarm information, and to send the alarm information to the traction substation monitoring center.

In some embodiments, the sulfur hexafluoride gas monitoring system includes a sulfur hexafluoride gas detector; the sulfur hexafluoride gas detector is arranged in each electrical device containing sulfur hexafluoride, for detecting whether a sulfur hexafluoride gas in a corresponding electrical device is leaking, and transmitting detected information to the microcontroller system for analysis and processing.

In some embodiments, the security prevention system includes an access control system, an infrared triple identification detector, a voice alarm, and a pressure sensor; the access control system is arranged on each main doorway in the traction substation, for controlling to prevent an intrusion of other foreign personnel or large animals; only people who are allowed to pass through an identification of the access control system are capable of using the access control system normally; the pressure sensor is arranged on a glass door frame; when a glass is broken, a force applied by the glass on the pressure sensor changes causing an output of the pressure sensor to change; the infrared triple identification detector and the voice alarm are arranged on an electronic fence of the traction substation; the infrared triple identification detector is configured to detect whether there are people or other large animals approaching the electronic fence; in response to idle people or other large animals approaching, the microcontroller system is configured to control the voice alarm to send out an alarm.

In some embodiments, the power lighting monitoring system includes a first current sensor and a first voltage sensor; the first current sensor and the first voltage sensor are arranged in a power line of each light controller, each water pump, and each fan, for detecting current and voltage changes of a corresponding light controller, water pump, and fan, and transmitting collected information to the microcontroller system; the microcontroller system determines whether the corresponding lighting controller, water pump and fan are running normally according to the current and voltage changes.

In some embodiments, the power monitoring system includes a second current sensor and a second voltage sensor; an incoming line and an outgoing line of each main electrical device are arranged with the second current sensor and the second voltage sensor, for monitoring a current and a voltage of the incoming line and the outgoing line of a corresponding main electrical device, and transmitting collected information to the microcontroller system through an optical fiber.

The 5G controller of the present disclosure transmits other information from the traction substation monitoring center to the railroad dispatching center, and the railroad dispatching center monitoring station can also transmit command information to the traction substation monitoring center through the 5G controller.

As the present disclosure adopts the structure of comprehensive monitoring of the traction substation and transmitting the information monitored by the traction substation to the railroad dispatching center through 5G communication technology, the following beneficial effects can be obtained.

The video monitoring system is configured to collect a video data stream in real time, to realize video monitoring in the traction substation; the device inspection system is configured to collect and upload an image of each electrical device along a line; the voice communication system is configured to realize a voice call between an inspection staff and a back-end monitoring staff; the environmental monitoring system is configured to monitor a temperature, a humidity, and a water intake in the traction substation and each electrical device; the fire alarm system is configured to monitor a fire in the traction substation in real time and provide corresponding alarm information; the sulfur hexafluoride gas monitoring system is configured to monitor a sulfur hexafluoride gas leakage in an electrical device; the security prevention system is configured to collect alarm information such as access control and electronic fence in the traction substation, to prevent an intrusion of other foreign personnel or large animals; the power lighting monitoring system is configured to collect operation information of a power lighting device such as a lighting controller, a water pump, a fan, etc. the power monitoring system is configured to monitor an input current and voltage and an output current and voltage of the traction substation in real time. In this way, all-round safety monitoring of traction substation may be realized, improving the safe operation of traction substation. The information monitored by traction substation is transmitted to railroad dispatching center through 5G communication technology to realize information sharing.

REFERENCE NUMERALS OF MAIN COMPONENTS

Figure 1:
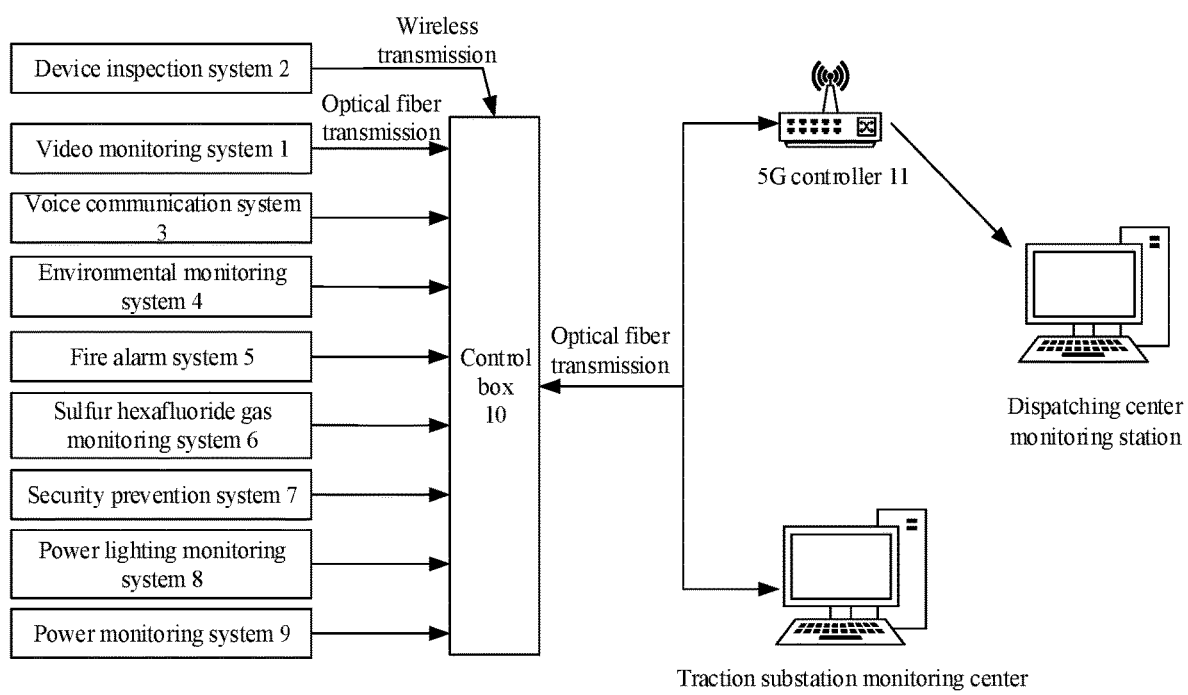
FIG. 1 is a schematic view of an overall structure of an auxiliary monitoring system for a traction substation according to an embodiment of the present disclosure.

| Video monitoring system | 1 | Device inspection system | 2 |
|---|---|---|---|
| Voice communication system | 3 | Environmental monitoring system | 4 |
| Fire alarm system | 5 | Sulfur hexafluoride gas monitoring system | 6 |
| Security prevention system | 7 | Power lighting monitoring system | 8 |
| Power monitoring system | 9 | Control box | 10 |
| 5G controller | 11 | First Wi-Fi module | 12 |
| Microcontroller System | 13 | Camera | 14 |
| Tracer robot | 15 | HD Camera | 16 |
| Second Wi-Fi module | 17 | Wireless energy receiver | 18 |
| Reader-writer | 19 | Charging station | 20 |
| Patrol point | 21 | Wireless energy transmitter | 22 |
| Transponder | 23 | Loudspeaker | 24 |
| Microphone | 25 | Humidity sensor | 26 |
| Temperature sensor | 27 | Fire Detector | 28 |
| Flood sensor | 29 | Sulfur hexafluoride gas detector | 30 |
| Sound and light alarm | 31 | Infrared triple identification detector | 32 |
| Access control system | 33 | Pressure sensor | 34 |
| Voice alarm | 35 | First voltage sensor | 36 |
| First current sensor | 37 | Second voltage sensor | 38 |
| Second current sensor | 39 | | |

DETAILED DESCRIPTION

The present disclosure is described in further detail hereinafter in conjunction with the embodiments and against the accompanying drawings.

Referring to FIGS. 1 to 8, which illustrate an auxiliary monitoring system for a traction substation in the present disclosure, including: a video monitoring system 1, a device inspection system 2, a voice communication system 3, an environmental monitoring system 4, a fire alarm system 5, a sulfur hexafluoride gas monitoring system 6, a safety prevention system 7, a power lighting monitoring system 8, a power monitoring system 9, a control box 10, and a 5G controller 11.

As shown in FIG. 1, the video monitoring system 1 is configured to collect video data stream in real time to realize video monitoring in the substation. The device inspection system 2 is configured to collect and upload an image of each electrical device along the line. The voice communication system 3 is configured to realize a voice call between an inspection staff and a back-end monitoring staff. The environmental monitoring system 4 is configured to monitor a temperature, a humidity, and a water intake in the substation and each electrical device. The fire alarm system 5 is configured to monitor a fire in the substation in real time and provide corresponding alarm information. The sulfur hexafluoride gas monitoring system 6 is configured to monitor a sulfur hexafluoride gas leakage in an electrical device. Alarm information such as access control and electronic fence in the substation is collected through the security prevention system 7 to prevent the intrusion of idle people and other large animals. The power lighting monitoring system 8 is configured to collect operation information of a power lighting device such as lighting controller, water pump, fan, etc. The power monitoring system 9 is configured to monitor input current and voltage and output current and voltage of the traction substation in real time. The video monitoring system 1, device inspection system 2, voice communication system 3, environmental monitoring system 4, fire alarm system 5, sulfur hexafluoride gas monitoring system 6, security system 7, power lighting monitoring system 8, and power monitoring system 9 each transmits the information collected to the control box 10, and the information is processed and calculated by the control box 10 and transmitted to a traction substation monitoring center. The 5G controller 11 is controlled to transmit a processed result to a railroad dispatching center monitoring station, thereby realizing information sharing, realizing all-round safety monitoring of the traction substation, and improving the safe operation of the traction substation.

Figure 7:
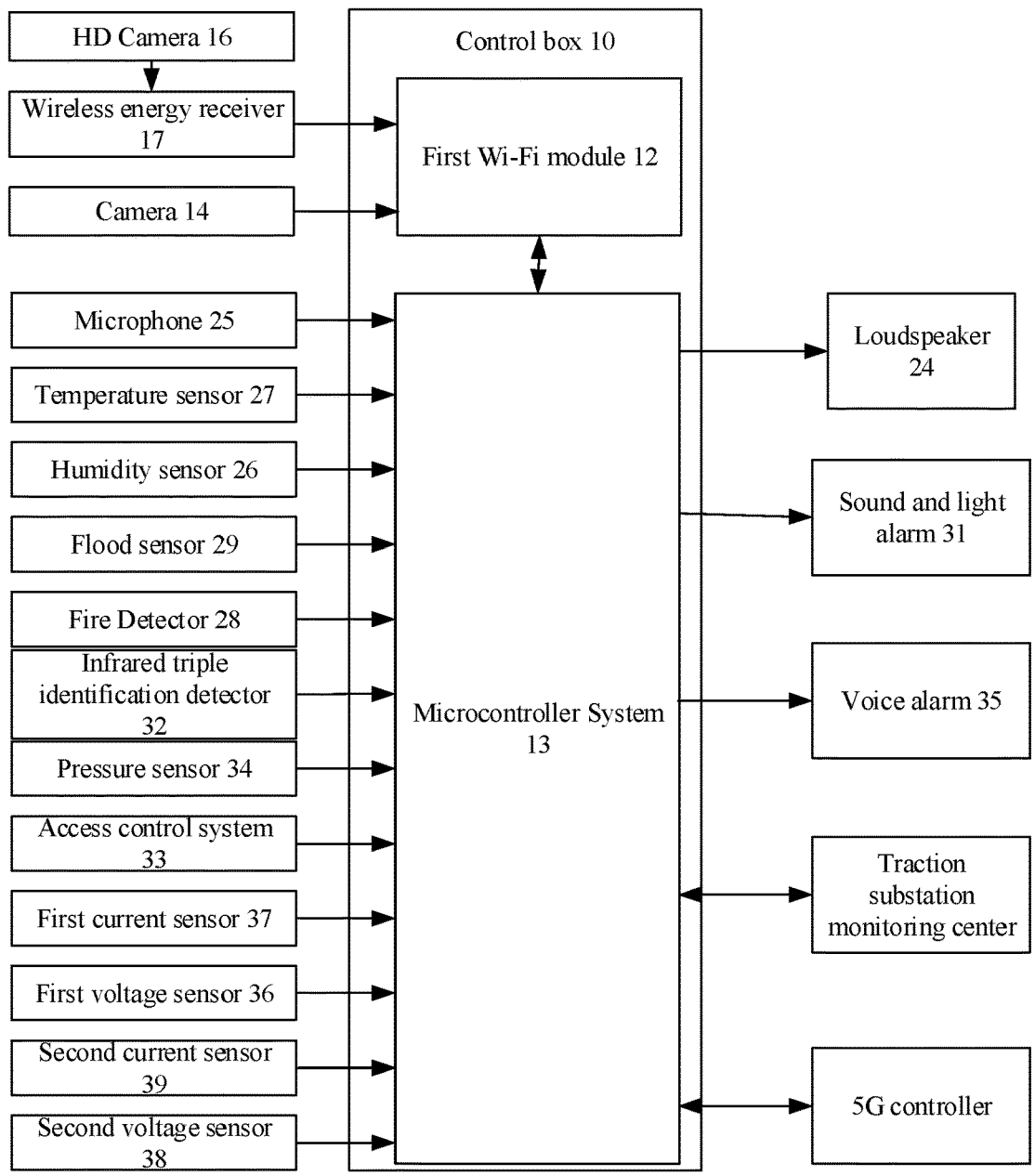
FIG. 7 is a working schematic view of an auxiliary monitoring system for a traction substation according to an embodiment of the present disclosure.

As shown in FIG. 7, a first Wi-Fi module 12 and a microcontroller system 13 are arranged in the control box 10. The first Wi-Fi module 12 establishes a wireless communication relationship with the second Wi-Fi module 17 to transmit a picture captured by a HD camera 16 directly through the second Wi-Fi module 17 to the first Wi-Fi module 12. The picture is transmitted by the first Wi-Fi module 12 through optical fiber to the traction substation monitoring center.

The video monitoring system 1 uses an existing camera 14 in the traction substation for video monitoring of each area and transmit the video to the control box 10 through optical fiber. The first Wi-Fi module 12 in the control box 10 transmits the video to the traction substation monitoring center, and the video is transmitted to the dispatching center monitoring station through the 5G controller 11 to achieve substation information sharing, which is conducive to improving the safety of railroad operation.

Figure 3:
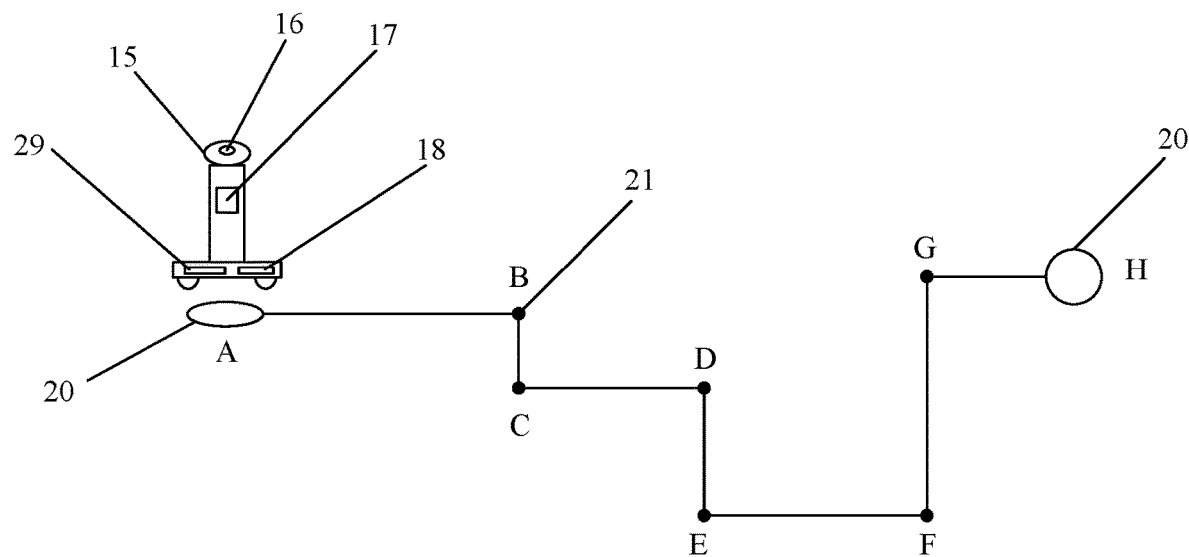
FIG. 3 is a structural schematic view of a device inspection system of an auxiliary monitoring system for a traction substation according to an embodiment of the present disclosure.

As shown in FIG. 3, the device inspection system 2 includes a tracer robot 15, a high definition (HD) camera 16, a second Wi-Fi module 17, a wireless energy receiver 18, a reader-writer 19, a charging station 20, and a patrol point 21.

The second Wi-Fi module 17 is arranged in the tracer robot 15 to establish a wireless communication relationship with the first Wi-Fi module 12. The wireless energy receiver 18 and the reader-writer 19 are arranged at a bottom of the tracer robot 15, and the tracer robot 15 is planned to follow a tracer route in the substation. The charging stations 20 are arranged at a starting point and an end point of the tracer route. The patrol points 21 are each arranged next to each device. When the tracer robot 15 is at the charging station 20, the charging station 20 sends electrical energy to the wireless energy receiver 18 to realize wireless charging of the tracer robot 15. When the tracer robot 15 reaches a patrol point 21, it stops and takes a picture of the corresponding electric device at the patrol point 21, and sends the picture to the first Wi-Fi module 12 in the control box 10 through the second Wi-Fi module 17. The picture is transmitted to the traction substation monitoring center through optical fiber for analysis to observe whether the appearance of the electric device is abnormal. When the tracer robot 15 reaches the end point, it stops at the end point for charging, and waits for another inspection requirement, until then the tracer robot 15 goes from the end point to the starting point again, which guarantees the uninterrupted power supply of the tracer robot 15.

Figure 4:
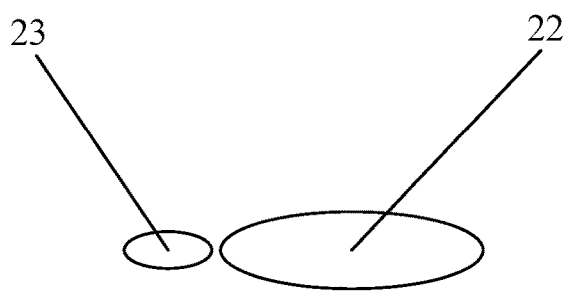
FIG. 4 is a structural schematic view of a charging station of an auxiliary monitoring system for a traction substation according to an embodiment of the present disclosure.

As shown in FIG. 4, the charging station 20 includes a transponder 23 and a radio energy transmitter 22. The charging station 20 is arranged with the transponder 23, and after the tracer robot 15 reaches the starting point or the end point, the reader-writer 19 may identify the transponder 23. At this time, the tracer robot 15 stops running, and the electrical energy is transmitted from the radio energy transmitter 22 to the radio energy receiver 18, thereby realizing the power supply to the tracer robot 15.

Each patrol point 21 is arranged with the transponder 23. Whenever the tracer robot 15 identifies a transponder 23, it is indicated that the tracer robot 15 has arrived next to the device to be inspected, and the HD camera 16 on the tracer robot 15 starts image acquisition of the electrical device.

Figure 5:
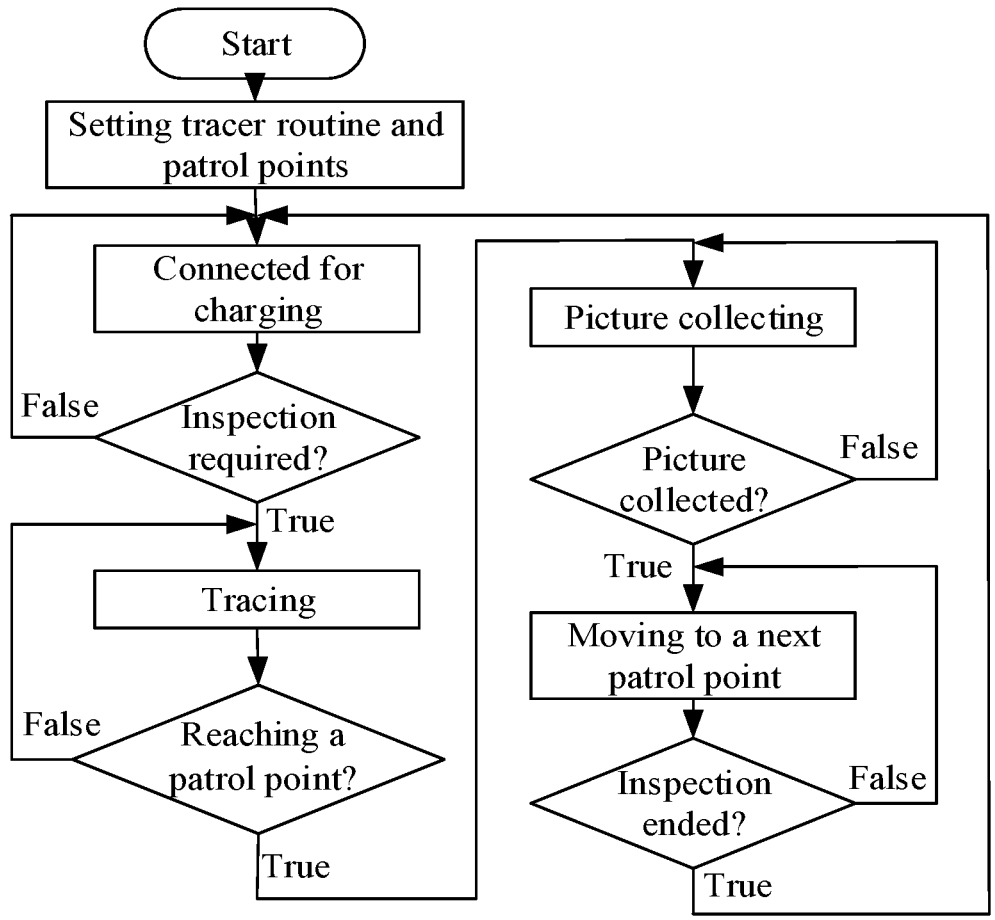
FIG. 5 is a flowchart of a scheme for identifying, by a tracer robot, a starting point, an end point, and an patrol point, of an auxiliary monitoring system for a traction substation according to an embodiment of the present disclosure.

As shown in FIG. 5, a scheme of the tracer robot 15 to identify the starting point, the end point, and the patrol point 21 is: the tracer route is set up in the tracer robot 15, including the number of the patrol points 21, the starting point, and the end point; the transponders 23 are arranged at the starting point, the patrol points 21, and the end point, thus the current location of the tracer robot 15 is determined by calculating the number of transponders 23; the tracer robot 15 is placed at the starting point for charging, and when inspection is required, the tracer robot 15 starts moving along the set tracer route; when the tracer robot 15 reaches a first patrol point 21, it starts the HD camera 16 to take a picture of the electrical device at this patrol point 21 and upload the picture to the traction substation monitoring center; after the picture is uploaded, the tracer robot 15 goes to a next patrol point 21 to take a picture; after all the patrol points 21 are completely passed, the tracer robot 15 determines that the inspection is over; then the tracer robot 15 will reach the end point by walking to one more transponder 23, while getting charged at the end point; when a second inspection is to be carried out, the end point is taken as the starting point and the second inspection is carried out by moving in a reverse direction.

Figure 6:
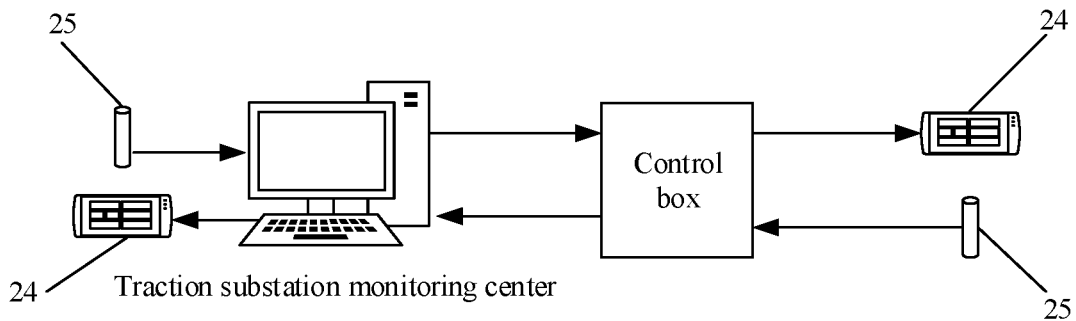
FIG. 6 is a structural schematic view of a voice communication system of an auxiliary monitoring system for a traction substation according to an embodiment of the present disclosure.

As shown in FIG. 6, the voice communication system 3 includes a microphone 25 and a loudspeaker 24. The microphones 25 and the loudspeakers 24 are arranged next to each electrical device in the traction substation monitoring center. When the inspection staff inspects the devices of the traction substation on site, he or she may communicate with the traction substation monitoring center by voice through the microphone 25 and loudspeaker 24 to improve the real-time command information.

The environmental monitoring system 4 includes a temperature sensor 27, a humidity sensor 26, and a flood sensor 29. Each electrical device is arranged with the temperature sensor 27, humidity sensor 26, and flood sensor 29. The flood sensor 29 is arranged at a bottom of the electrical device. The temperature sensor 27 and humidity sensor 26 are configured to detect the temperature and humidity in the electrical device. The flood sensor 29 is configured to detect whether the electric device is flooded. Another temperature sensor 27, humidity sensor 26, and flood sensor 29 may be also arranged in a key area of the substation to detect the temperature and humidity and water content information in the substation. The information detected by the temperature sensor 27, humidity sensor 26, and flood sensor 29 is transmitted to the microcontroller system in the control box 10 for analysis and processing to get knowledge about whether the substation is flooded. The microcontroller system transmits the processed result to the traction substation monitoring center and 5G controller 11 through optical fiber, and the 5G controller 11 transmits the information to the railroad dispatching center monitoring station.

The fire alarm system 5 includes a fire detector 28, and a sound and light alarm 31. The fire detector 28 and the sound and light alarm 31 are arranged in each electrical device and the key area in the substation. The fire detector 28 is configured to monitor the occurrence of fire in the substation and each electrical device in real time. Once a fire occurs, the microcontroller system controls the sound and light alarm 31 to send alarm information, and the alarm information will also be sent to the traction substation monitoring center to remind the staff in the traction substation to pay attention, and also to ensure that the traction substation monitoring center can grasp the fire situation in the substation in real time.

The sulfur hexafluoride gas monitoring system 6 includes a sulfur hexafluoride gas detector 30, which is arranged in each electrical device containing sulfur hexafluoride to detect whether the sulfur hexafluoride gas in the corresponding electrical device is leaking, and to transmit the detected information to the microcontroller system for analysis and processing. The processed result is transmitted by the microcontroller system to the traction substation monitoring center and 5G controller 11 through optical fiber, and the 5G controller 11 transmits the information to the railroad dispatching center monitoring station.

The security prevention system 7 includes an access control system 33, an infrared triple identification detector 32, a voice alarm 35, and a pressure sensor 34. The access control system 33 is arranged on each main doorway in the traction substation, for controlling to prevent the intrusion of other foreign personnel or large animals. Only those who are allowed to pass through the access control system 33 identification can use the access control system 33 normally. The pressure sensor 34 is arranged on a glass door frame. When the glass is broken, the force applied by the glass on the pressure sensor 34 will change, thus causing the output of the pressure sensor 34 to change. The detected information is transmitted to the microcontroller system, and the microcontroller system determines whether the glass door is broken according to the change information of the pressure sensor 34. The infrared triple identification detector 32 and voice alarm 35 are arranged on an electronic fence of the traction substation. The infrared triple identification detector 32 is configured to detect whether there are people or other large animals approaching the electronic fence, and once there are idle people or other large animals approaching, the microcontroller system controls the voice alarm 35 to send out an alarm to remind idle people or other large animals not to approach, and transmits the identification information to the traction substation monitoring center. Staff will be dispatched by the traction substation monitoring center to repel.

The power lighting monitoring system 8 includes a first current sensor 37 and a first voltage sensor 36. The first current sensor 37 and the first voltage sensor 36 are arranged in a power line of each light controller, water pump, and fan, for detecting the current, voltage changes of the light controller, water pump, and fan. The collected information is transmitted to the microcontroller system, and the microcontroller system determines whether the lighting controller, water pump and fan are running normally according to the current and voltage changes. The processed result is transmitted by the microcontroller system to the traction substation monitoring center through optical fiber, such that the traction substation monitoring center can easily know the operation information of the lighting controller, water pump, fan, and other power lighting devices.

The power monitoring system 9 includes a second current sensor 39 and a second voltage sensor 38. Each main electrical device is arranged with the second current sensor 39 and second voltage sensor 38 installed on an incoming and an outgoing line, for monitoring the current and voltage of the incoming and outgoing line of each main electrical device, and transmitting the collected information to the microcontroller system through optical fiber. The microcontroller system transmits the processed result to the traction substation monitoring center and 5G controller 11 through optical fiber, and the 5G controller 11 transmits the information to the railroad dispatching center monitoring station, which facilitates the traction substation monitoring center and the railroad dispatching center to view the operation of the main electrical device in the traction substation in real time.

Figure 8:
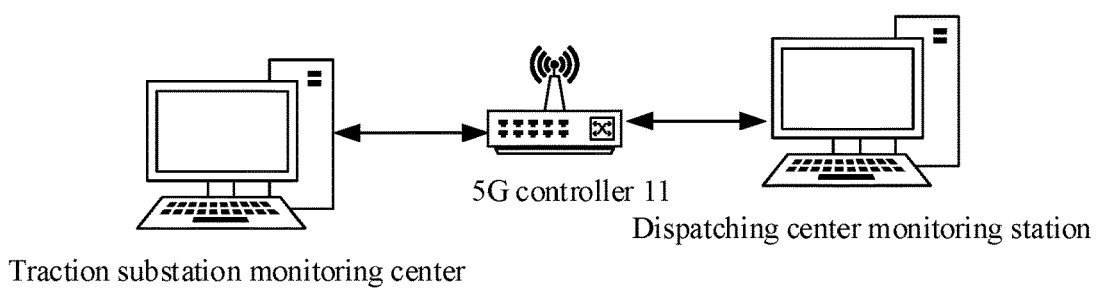
FIG. 8 is a relationship schematic view among a 5G controller an auxiliary monitoring system for a traction substation, a monitoring center of a traction substation, and a monitoring station of a railroad dispatching center according to an embodiment of the present disclosure.

As shown in FIG. 8, the 5G controller 11 transmits other information from the traction substation monitoring center to the railroad dispatching center, and the railroad dispatching center monitoring station can also transmit command information to the traction substation monitoring center through the 5G controller 11 to achieve information sharing through 5G communication technology.

The working principle and working process of the present disclosure are as follows.

Figure 2:
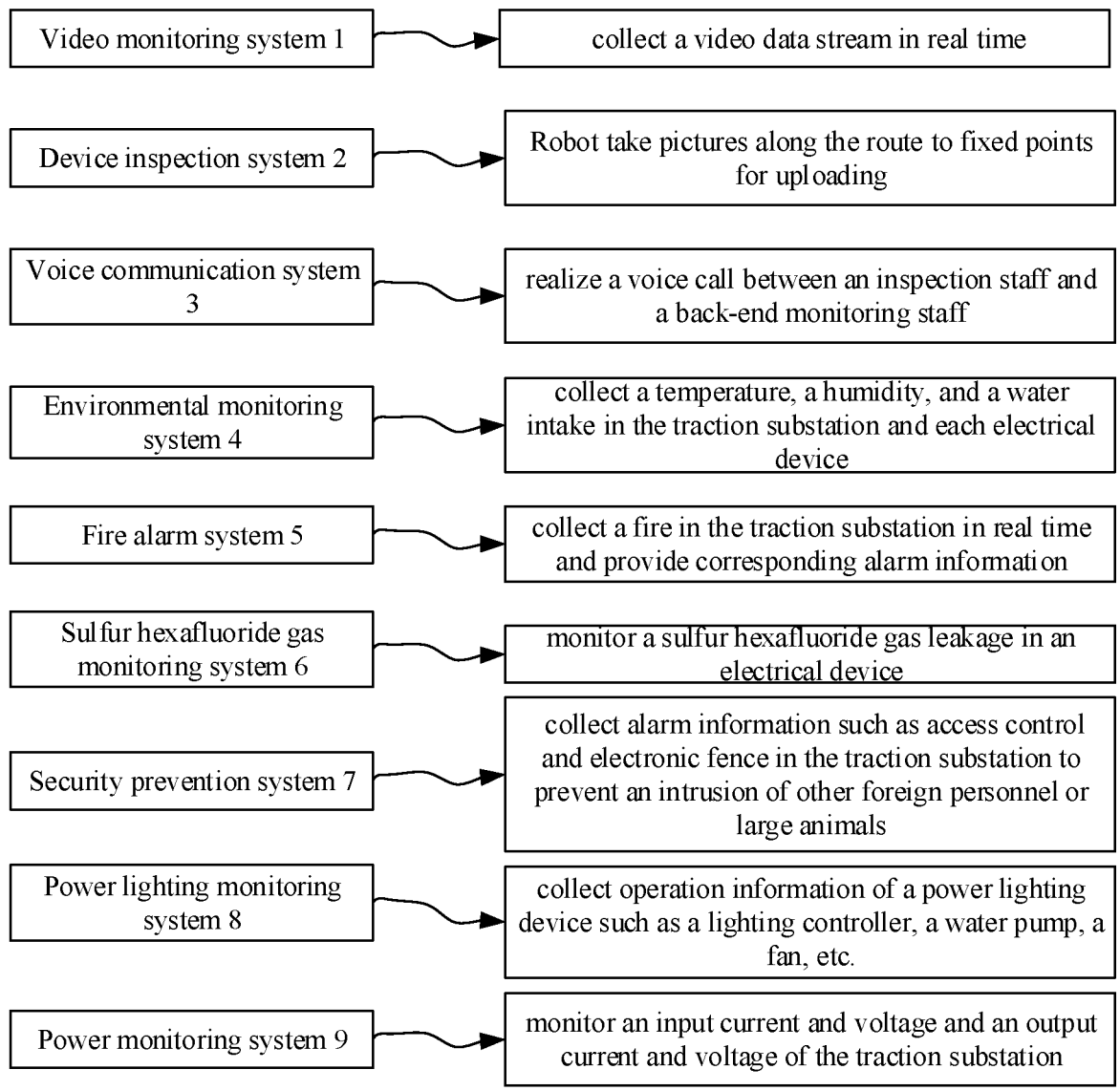
FIG. 2 is a flowchart of an overall scheme of an auxiliary monitoring system for a traction substation according to an embodiment of the present disclosure.

As shown in FIG. 2, the video monitoring of each area is carried out by the existing camera 14 in the traction substation and transmitted to the first Wi-Fi module 12 through optical fiber; the pictures taken by the HD camera 16 are sent to the first Wi-Fi module 12 in the control box 10 through the second Wi-Fi module 17; the microphone 25 and loudspeaker 24 are arranged next to each electrical device 24 in the traction substation monitoring center; the inspection staff can communicate with the traction substation monitoring center through the microphone 25 and loudspeaker 24 when inspecting the device of the traction substation on site; the temperature sensor 27, humidity sensor 26, flood sensor 29 are arranged in each electrical device; the flood sensor 29 is arrange at a bottom of the electrical device, the temperature sensor 27 and humidity sensor 26 are configured to detect the temperature and humidity condition in the electrical device respectively, and the water flood sensor 29 is configured to detect whether the power device is flooded; another temperature sensor 27, humidity sensor 26, and water flood sensor 29 are arranged in the key area of the substation to detect the temperature and humidity and water content information in the substation; the information detected by the temperature sensor 27, humidity sensor 26, and water flood sensor 29 is transmitted to the microcontroller system in the control box 10 for analysis and processing; the fire detector 28 is configured to monitor the fire situation in the substation and the electrical device in real time; once a fire occurs, the microcontroller system controls the sound and light alarm 31 to send out alarm information and send the alarm information to the traction substation monitoring center; the access control system 33 is configured to feed the information of incoming and outgoing personnel to the microcontroller system; the pressure sensor 34 is configured to transmit the detected information to the microcontroller system, and the microcontroller system determines whether the glass door is broken according to the change information of the pressure sensor 34; the infrared triple identification detector 32 is configured to detect whether there are people or other large animals approaching the electronic fence, and once there are idle people or other large animals approaching, the microcontroller system will control the voice alarm 35 to issue an alarm; the first current sensor 37 and the first voltage sensor 36 are configured to detect the current and voltage changes of the light controller, water pump and fan, and to transmit the collected information to the microcontroller system, which determines whether the light controller, water pump and fan are running normally according to the current and voltage changes; each main electrical device is arranged with the second current sensor 39 and second voltage sensor 38 installed on an incoming and an outgoing line, for monitoring the current and voltage of the incoming and outgoing line of each main electrical device, and transmitting the collected information to the microcontroller system through optical fiber; the processed result is transmitted by the microcontroller system to the traction substation monitoring center and 5G controller 11 through optical fiber, and the 5G controller 11 transmits the information to the railroad dispatch center monitoring station.

What is claimed is:

1. An auxiliary monitoring system for a traction substation, comprising: a video monitoring system, a device inspection system, a voice communication system, an environmental monitoring system, a fire alarm system, a sulfur hexafluoride gas monitoring system, a safety prevention system, a power lighting monitoring system, a power monitoring system, a control box, and a 5G controller;

wherein the video monitoring system is configured to collect a video data stream in real time, to realize video monitoring in the traction substation; the device inspection system is configured to collect and upload an image of each electrical device along a line; the voice communication system is configured to realize a voice call between an inspection staff and a back-end monitoring staff; the environmental monitoring system is configured to monitor a temperature, a humidity, and a water intake in the traction substation and each electrical device; the fire alarm system is configured to monitor a fire in the traction substation in real time and provide corresponding alarm information; the sulfur hexafluoride gas monitoring system is configured to monitor a sulfur hexafluoride gas leakage in an electrical device; the security prevention system is configured to collect alarm information such as access control and electronic fence in the traction substation; the power lighting monitoring system is configured to collect operation information of a power lighting device such as a lighting controller, a water pump, and a fan; the power monitoring system is configured to monitor an input current and voltage and an output current and voltage of the traction substation in real time;

the video monitoring system, the device inspection system, the voice communication system, the environmental monitoring system, the fire alarm system, the sulfur hexafluoride gas monitoring system, the security system, the power lighting monitoring system, and the power monitoring system each transmits collected information to the control box; the information is processed and calculated by the control box and transmitted to a traction substation monitoring center; the 5G controller is controlled to transmit a processed result to a railroad dispatching center monitoring station;

the control box is arranged with a first Wi-Fi module and a microcontroller system;

the device inspection system comprises a tracer robot, a high definition (HD) camera, a second Wi-Fi module, a wireless energy receiver, a reader-writer, charging stations, and patrol points; wherein the second Wi-Fi module is arranged in the tracer robot to establish a wireless communication relationship with the first Wi-Fi module; the wireless energy receiver and the reader-writer are arranged at a bottom of the tracer robot, and the tracer robot is planned to follow a tracer route in the traction substation; one of the charging station is arranged at a starting point of the tracer route, and the other of the charging station is arranged at an end point of the tracer route; the patrol points are each arranged next to a corresponding device; when the tracer robot is at one of the charging stations, the one of the charging stations sends electrical energy to the wireless energy receiver to realize wireless charging of the tracer robot; when the tracer robot reaches one of the patrol points, the tracer robot is configure to stop and take a picture of a corresponding electric device at the one of the patrol points, and send the picture to the first Wi-Fi module in the control box through the second Wi-Fi module; the picture is transmitted to the traction substation monitoring center through an optical fiber; when the tracer robot reaches the end point, the tracer robot is configure to stop at the end point for charging, and waits for another inspection requirement; when the tracer robot receives another inspection requirement, the tracer robot is configure to move from the end point to the starting point again, thereby guaranteeing an uninterrupted power supply to the tracer robot;

each of the charging stations comprises a transponder and a radio energy transmitter; the charging station is arranged with the transponder, and after the tracer robot reaches the starting point or the end point, the reader-writer is capable of identifying the transponder; in response to identifying the transponder, the tracer robot is configured to stop miming, and the electrical energy is transmitted from the radio energy transmitter to the radio energy receiver, thereby realizing the power supply to the tracer robot;

a scheme of the tracer robot to identify the starting point, the end point, and the patrol points is: the tracer route is set up in the tracer robot, including setting the number of the patrol points, the starting point, and the end point; the transponders are arranged at the starting point, the patrol points, and the end point; a current location of the tracer robot is determined by calculating the number of the transponders; the tracer robot is placed at the starting point for charging, and when an inspection is required, the tracer robot is configured to start moving along the set tracer route; when the tracer robot reaches a first patrol point, the tracer robot is configured to start the HD camera to take a picture of a corresponding electrical device at the first patrol point and upload the picture to the traction substation monitoring center; after the picture is uploaded, the tracer robot is configured to move to a next patrol point to take another picture; after all the patrol points are completely passed, the tracer robot determines that the inspection is over; the tracer robot reaches the end point by moving to a next one of the transponders, while getting charged at the end point; when a second inspection is to be carried out, the end point is taken as another starting point and the second inspection is carried out by the tracer robot moving in a reverse direction.

2. The auxiliary monitoring system according to claim 1, wherein the environmental monitoring system comprises a temperature sensor, a humidity sensor, and a flood sensor; each electrical device is arranged with the temperature sensor, the humidity sensor, and the flood sensor; the flood sensor is arranged at a bottom of a corresponding electrical device; the temperature sensor and the humidity sensor are configured to detect the temperature and the humidity in the corresponding electrical device; the flood sensor is configured to detect whether the corresponding electric device is flooded; another temperature sensor, another humidity sensor, and another flood sensor are arranged in a key area of the traction substation to detect a temperature, a humidity and water content information in the traction substation; information detected by the temperature sensor, the humidity sensor, and the flood sensor is transmitted to the microcontroller system in the control box for analysis and processing.

3. The auxiliary monitoring system according to claim 1, wherein the security prevention system comprises an access control system, an infrared triple identification detector, a voice alarm, and a pressure sensor; the access control system is arranged on each main doorway in the traction substation, for controlling to prevent an intrusion of other foreign personnel or large animals; only people who are allowed to pass through an identification of the access control system are capable of using the access control system normally; the pressure sensor is arranged on a glass door frame; when a glass is broken, a force applied by the glass on the pressure sensor changes causing an output of the pressure sensor to change; the infrared triple identification detector and the voice alarm are arranged on an electronic fence of the traction substation; the infrared triple identification detector is configured to detect whether there are people or other large animals approaching the electronic fence; in response to idle people or other large animals approaching, the microcontroller system is configured to control the voice alarm to send out an alarm.

4. The auxiliary monitoring system according to claim 1, wherein the fire alarm system comprises a fire detector and a sound and light alarm; the fire detector and the sound and light alarm are arranged in each electrical device and a key area in the traction substation; the fire detector is configured to monitor an occurrence of fire in the traction substation and each electrical device in real time; in response to a fire occurring, the microcontroller system is configured to control the sound and light alarm to send alarm information, and to send the alarm information to the traction substation monitoring center.

5. The auxiliary monitoring system according to claim 1, wherein the sulfur hexafluoride gas monitoring system comprises a sulfur hexafluoride gas detector; the sulfur hexafluoride gas detector is arranged in each electrical device containing sulfur hexafluoride, for detecting whether a sulfur hexafluoride gas in a corresponding electrical device is leaking, and transmitting detected information to the microcontroller system for analysis and processing; a processed result is transmitted by the microcontroller system to the traction substation monitoring center and 5G controller through an optical fiber, and the 5G controller transmits the information to the railroad dispatching center monitoring station.

6. The auxiliary monitoring system according to claim 1, wherein the power lighting monitoring system comprises a first current sensor and a first voltage sensor; the first current sensor and the first voltage sensor are arranged in a power line of each light controller, each water pump, and each fan, for detecting current and voltage changes of a corresponding light controller, water pump, and fan, and transmitting collected information to the microcontroller system; the microcontroller system determines whether the corresponding lighting controller, water pump and fan are running normally according to the current and voltage changes; a processed result is transmitted by the microcontroller system to the traction substation monitoring center through an optical fiber.

7. The auxiliary monitoring system according to claim 1, wherein the power monitoring system comprises a second current sensor and a second voltage sensor; an incoming line and an outgoing line of each main electrical device are arranged with the second current sensor and the second voltage sensor, for monitoring a current and a voltage of the incoming line and the outgoing line of a corresponding main electrical device, and transmitting collected information to the microcontroller system through an optical fiber; the microcontroller system transmits a processed result to the traction substation monitoring center and the 5G controller through an optical fiber, and the 5G controller transmits the information to the railroad dispatching center monitoring station.

* * * * *